US009129754B2

(12) United States Patent
Kuriki et al.

(10) Patent No.: US 9,129,754 B2
(45) Date of Patent: Sep. 8, 2015

(54) ELECTRODE FOR POWER STORAGE DEVICE AND POWER STORAGE DEVICE

(75) Inventors: Kazutaka Kuriki, Kanagawa (JP); Mikio Yukawa, Kanagawa (JP); Nobuhiro Inoue, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 558 days.

(21) Appl. No.: 13/597,652

(22) Filed: Aug. 29, 2012

(65) Prior Publication Data
US 2013/0059195 A1   Mar. 7, 2013

(30) Foreign Application Priority Data

Sep. 2, 2011 (JP) .................................. 2011-191736

(51) Int. Cl.
*H01M 4/64* (2006.01)
*H01M 2/02* (2006.01)
*H01G 9/04* (2006.01)
(Continued)

(52) U.S. Cl.
CPC ............... *H01G 11/28* (2013.01); *H01G 11/26* (2013.01); *H01G 11/50* (2013.01); *H01M 4/134* (2013.01); *H01M 4/366* (2013.01); *H01M 4/667* (2013.01); *H01M 4/621* (2013.01); *H01M 4/625* (2013.01); *H01M 10/052* (2013.01); *H01M 2004/021* (2013.01); *Y02E 60/122* (2013.01); *Y02E 60/13* (2013.01)

(58) Field of Classification Search
CPC ..................... H01M 10/052; H01M 2004/021; H01M 4/134; H01M 4/366; H01M 4/621; H01M 4/625; H01M 4/667; H01G 11/26; H01G 11/28; H01G 11/50; Y02E 60/122; Y02E 60/13
See application file for complete search history.

(56) References Cited

U.S. PATENT DOCUMENTS 4,764,853 A   8/1988  Thomas et al.
6,134,902 A  10/2000  Curry
(Continued)

FOREIGN PATENT DOCUMENTS

JP   2001-210315   8/2001
JP   2003-246700   9/2003
(Continued)

OTHER PUBLICATIONS

Kamins et al., "Ti-catalyzed Si nanowires by chemical vapor deposition: Microscopy and grown mechanisms," J. Appl. Phys. (Journal of Applied Physics), Jan. 15, 2001, vol. 89, No. 2, pp. 1008-1016.
(Continued)

*Primary Examiner* — Carlos Barcena
(74) *Attorney, Agent, or Firm* — Nixon Peabody LLP; Jeffrey L. Costellia

(57) ABSTRACT

To provide an electrode for a power storage device, which has high reliability and can be miniaturized. To provide a power storage device including the electrode. In the electrode, a stress-relieving layer which relieves internal stress of an active material layer including a whisker is provided over a current collector. By the stress-relieving layer, deformation of the current collector can be suppressed and the productivity of the power storage device can be increased. In addition, the size of the power storage device can be reduced and the reliability thereof can be increased. Graphene may be formed so as to cover the active material layer including a whisker.

20 Claims, 5 Drawing Sheets

(51) Int. Cl.
  *H01G 11/28* (2013.01)
  *H01M 4/134* (2010.01)
  *H01M 4/36* (2006.01)
  *H01M 4/66* (2006.01)
  *H01G 11/26* (2013.01)
  *H01G 11/50* (2013.01)
  *H01M 4/62* (2006.01)
  *H01M 10/052* (2010.01)
  *H01M 4/02* (2006.01)

(56) References Cited

U.S. PATENT DOCUMENTS

| | | |
|---|---|---|
| 6,685,804 B1 | 2/2004 | Ikeda et al. |
| 6,887,511 B1 | 5/2005 | Shima et al. |
| 7,015,496 B2 | 3/2006 | Ohnuma et al. |
| 7,192,673 B1 | 3/2007 | Ikeda et al. |
| 7,235,330 B1 | 6/2007 | Fujimoto et al. |
| 7,241,533 B1 | 7/2007 | Ikeda et al. |
| 7,396,409 B2 | 7/2008 | Hatta et al. |
| 7,410,728 B1 | 8/2008 | Fujimoto et al. |
| 7,794,881 B1 | 9/2010 | Fujimoto et al. |
| 7,846,583 B2 | 12/2010 | Oh et al. |
| 2002/0168574 A1 | 11/2002 | Ahn et al. |
| 2007/0007239 A1 | 1/2007 | Lee et al. |
| 2007/0295718 A1 | 12/2007 | Takei et al. |
| 2009/0045680 A1 | 2/2009 | Litch et al. |
| 2009/0117467 A1 | 5/2009 | Zhamu et al. |
| 2010/0151329 A1 | 6/2010 | Sato et al. |
| 2010/0209784 A1 | 8/2010 | Yamazaki et al. |
| 2011/0151290 A1 | 6/2011 | Cui et al. |
| 2011/0266654 A1 | 11/2011 | Kuriki et al. |
| 2011/0289767 A1 | 12/2011 | Yamazaki |
| 2011/0292564 A1 | 12/2011 | Yamazaki |
| 2011/0294005 A1 | 12/2011 | Kuriki et al. |
| 2011/0294011 A1 | 12/2011 | Kuriki et al. |
| 2011/0300445 A1 | 12/2011 | Murakami et al. |
| 2011/0305950 A1 | 12/2011 | Kuriki et al. |
| 2012/0003383 A1 | 1/2012 | Furuno |
| 2012/0003530 A1 | 1/2012 | Kuriki et al. |
| 2012/0003807 A1 | 1/2012 | Furuno et al. |
| 2012/0015247 A1 | 1/2012 | Yoshida |
| 2012/0070738 A1 | 3/2012 | Yoshida |
| 2012/0135302 A1 | 5/2012 | Yokoi et al. |
| 2013/0011550 A1* | 1/2013 | Takeuchi et al. ............... 427/58 |
| 2013/0017443 A1* | 1/2013 | Yamazaki ...................... 429/211 |
| 2013/0043057 A1* | 2/2013 | Oguni et al. ................ 174/126.2 |
| 2013/0052537 A1* | 2/2013 | Takeuchi et al. ........... 429/231.8 |

FOREIGN PATENT DOCUMENTS

| | | |
|---|---|---|
| JP | 2004-281317 | 10/2004 |
| WO | WO 2006-028316 A1 | 3/2006 |

OTHER PUBLICATIONS

Miyamoto et al., "Polytypism and Amorphousness in Silicon Whiskers," J. Phys. Soc. Jpn. (Journal of the Physical Society of Japan), Jan. 1, 1978, vol. 44, No. 1, pp. 181-190.

Kohno et al., "Silicon Nanoneedles Grown by a Simple Thermal Treatment Using Metal-Sulfur Catalysts," Jpn. J. Appl. Phys. (Japanese Journal of Applied Physics), Feb. 1, 2002, vol. 41, No. 2A, pp. 577-578.

Cui et al., "Crystalline-Amorphous Core-Shell Silicon Nanowires for High Capacity and High Current Battery Electrodes," Nano Letters, 2009, vol. 9, No. 1, pp. 491-495.

Chan et al., "High-Performance Lithium Battery Anodes Using Silicon Nanowires", Nature Nanotechnology, Dec. 16, 2007, vol. 3, pp. 31-35.

\* cited by examiner

ELECTRODE FOR POWER STORAGE DEVICE AND POWER STORAGE DEVICE

BACKGROUND OF THE INVENTION

1. Field of the Invention

The present invention relates to a power storage device and a method for manufacturing the power storage device. Note that, in this specification, power storage devices refer to part or all of devices each having a function of storing electric power.

2. Description of the Related Art

In recent years, power storage devices such as lithium-ion secondary batteries and lithium-ion capacitors have been developed.

An electrode for the power storage device is manufactured by providing an active material over a surface of a current collector. As an active material which occludes lithium, a material which can occlude and release ions serving as carriers, such as graphite or silicon, is used. In particular, silicon has attracted attention because it has a higher theoretical capacity than graphite and is advantageous in increasing the capacity of power storage device.

For example, Non-Patent Document 1 discloses a lithium-ion secondary battery formed using whisker-like single crystal silicon (silicon nanowires) as an active material. Non-Patent Document 1 suggests that in the case where whisker-like silicon is used, the structure of an electrode is not easily damaged even when the volume of silicon is changed due to occlusion and release of lithium ions, resulting in increases in charge/discharge characteristics.

REFERENCE

[Non-Patent Document 1] CANDACE K. CHAN et al., "High-performance lithium battery anodes using silicon nanowires", Nature Nanotechnology, 2008, Vol. 3, pp. 31-35

SUMMARY OF THE INVENTION

However, whisker-like silicon has strong tensile stress; thus, when the whisker-like silicon is used for an active material layer of an electrode of a power storage device, there is a problem in that a current collector is deformed in the case where the thickness of the current collector is reduced or in the case where a material having high malleability or elasticity is used for the current collector.

Deformation of the current collector reduces the productivity of the power storage device. When the thickness of the current collector is increased to prevent deformation of the current collector, reduction in the size of the power storage device is hindered. Further, in the case of the deformation of the current collector, an active material is easily separated when it changes in volume by occluding and releasing Li ions and consequently the reliability of the power storage device is decreased.

As a material of an active material layer other than silicon, tin, aluminum, germanium, titanium, or the like can be used; however, all whisker-like active material layers formed using these materials have problems as described above.

An object of one embodiment of the present invention is to provide an electrode for a power storage device with high productivity.

Another object of one embodiment of the present invention is to provide a power storage device with high productivity.

Another object of one embodiment of the present invention is to provide an electrode for a power storage device, which can be miniaturized.

Another object of one embodiment of the present invention is to provide a power storage device which can be miniaturized.

Another object of one embodiment of the present invention is to provide a highly reliable electrode for a power storage device.

Another object of one embodiment of the present invention is to provide a highly reliable power storage device.

According to one embodiment of the present invention, an electrode for a power storage device includes a stress-relieving layer over a current collector and an active material layer including a whisker over the stress-relieving layer. The internal stress of the stress-relieving layer has stress in a direction different from that of the internal stress of the active material layer. Another embodiment of the present invention is a power storage device including the electrode.

Here, a "direction of internal stress of a stress-relieving layer is different from a direction of internal stress of an active material layer" means that, for example, the internal stress of the stress-relieving layer is compressive stress when the internal stress of the active material layer is tensile stress. When the direction of the internal stress of the active material layer with respect to the current collector is different from the direction of the internal stress of the stress-relieving layer with respect to the current collector, bending of the current collector can be suppressed.

According to one embodiment of the present invention, an electrode for a power storage device includes a current collector, an active material layer including a whisker, and a stress-relieving layer. The current collector is provided between the active material layer and the stress-relieving layer. The internal stress of the stress-relieving layer is stress in the same direction as that of the internal stress of the active material layer. Another embodiment of the present invention is a power storage device including the electrode.

Here, a "direction of internal stress of a stress-relieving layer is the same as a direction of internal stress of an active material layer" means that, for example, the internal stress of the stress-relieving layer is tensile stress when the internal stress of the active material layer is tensile stress. When the direction of the internal stress of the active material layer with respect to the current collector is the same as the direction of the internal stress of the stress-relieving layer with respect to the current collector, bending of the current collector can be suppressed.

In addition, when the active material layer and the stress-relieving layer have stress with almost the same absolute values, bending of the current collector can be further suppressed. The values of the stress of the active material layer and the stress of the stress-relieving layer can be determined depending on the film formation conditions or the film thicknesses of the layers.

According to one embodiment of the present invention, an electrode for a power storage device with high productivity can be provided, and in addition, by including the electrode, a power storage device with high productivity can be provided.

According to one embodiment of the present invention, an electrode for a power storage device, which can be miniaturized, can be provided, and in addition, by including the electrode, a power storage device which can be miniaturized can be provided.

According to one embodiment of the present invention, a highly reliable electrode for a power storage device can be provided, and in addition, by including the electrode, a highly reliable power storage device can be provided.

One embodiment of the present invention achieves at least one of the above objects.

DETAILED DESCRIPTION OF THE INVENTION

Figure 1A:
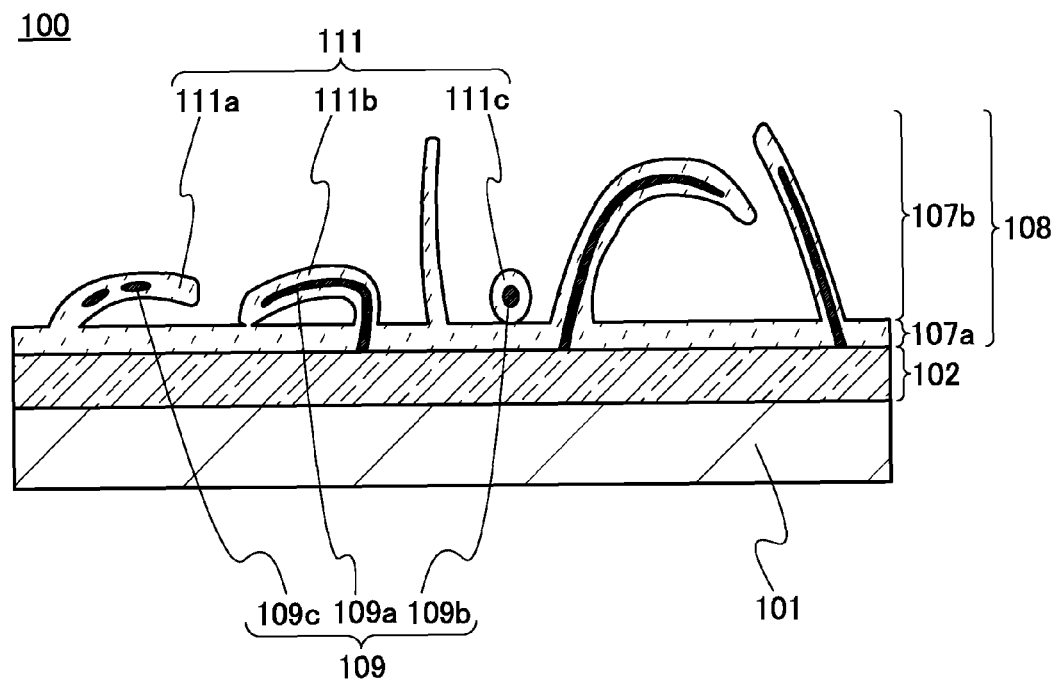
FIGS. 1A and 1B are cross-sectional views each illustrating a surface of an electrode for a power storage device according to one embodiment of the present invention.

Embodiments of the present invention will be described below with reference to the drawings. Note that the present invention is not limited to the following description, and it will be easily understood by those skilled in the art that various changes and modifications can be made without departing from the spirit and scope of the present invention. Thus, the present invention should not be interpreted as being limited to the following description of the embodiments. In description using the drawings for reference, in some cases, common reference numerals are used for the same portions in different drawings. Further, in some cases, the same hatching patterns are applied to similar portions, and the similar portions are not necessarily designated by reference numerals. (Embodiment 1)

In this embodiment, an electrode and a method for manufacturing the electrode will be described with reference to drawings.

FIG. 1A is a schematic cross-sectional view of part of a surface of an electrode 100. The electrode 100 includes a current collector 101, a stress-relieving layer 102 over the current collector 101, and an active material layer 108 over the stress-relieving layer 102.

The active material layer 108 includes a region 107a and a region 107b, and the region 107b includes a plurality of whisker-like (string-like or fibrous) active materials (hereinafter, also simply referred to as a whisker).

The region 107a is provided in contact with the stress-relieving layer 102. In the region 107b, a whisker projects from the region 107a and is provided so as to be dispersed randomly. Therefore, the active material layer 108 has a fine surface structure reflecting the shape of the whisker.

Note that the interface between the region 107a and the region 107b is not clear.

Thus, the following surface is defined as the interface between the region 107a and the region 107b: a surface that is in the same level as the bottom of the deepest valley of the valleys formed among whiskers and parallel to a surface of the current collector 101 or the stress-relieving layer 102.

In the active material layer 108, the whisker-like active material preferably includes a core 109 which has a structure having crystallinity and an outer shell 111 which has an amorphous structure. The outer shell 111 having an amorphous structure has a feature of resistance to change in volume due to occlusion and release of ions (e.g., relieving stress caused by change in volume). The core 109 having a structure having crystallinity has an excellent conductivity and ion mobility and has a feature of high speed occlusion and release of ions per unit mass. Therefore, by using the electrode 100 including the whisker-like active material having the core 109 and the outer shell 111, high speed charge/discharge can be performed, and a power storage device with high charge/discharge capacity and improved cycle characteristics can be manufactured.

Note that the core 109 is not limited to the core which is in contact with the stress-relieving layer 102 such as a core 109a, and may be the core which extends from front to back of the drawing such as a core 109b and the core which is localized such as a core 109c. That is, the core 109a, the core 109b, and the core 109c are collectively referred to as the core 109. Further, an outer shell 111a, an outer shell 111b, and an outer shell 111c are collectively referred to as the outer shell 111.

The whisker-like active material in the region 107b may each have a columnar (cylindrical or prismatic) shape or a conical or pyramidal shape (which may also be referred to as a needle-like shape). The top of the whisker-like active material may be curved.

The longitudinal directions of a plurality of whisker-like active materials in the region 107b do not necessarily have to be the same. As an example in which the longitudinal directions of the plurality of whisker-like active materials are different from each other, in FIGS. 1A and 1B and FIGS. 2A and 2B, a transverse cross-sectional shape of the active material (the cross-sectional shape of a portion including the core 109b and the outer shell 111c) is shown as well as a longitudinal cross-sectional shape of the active material (the cross-sectional shape of a portion including the core 109a and the outer shell 111b).

In a transverse cross section of the whisker-like active material in the region 107b, the core 109 may or may not be observed in the whisker-like active material depending on a position. Further, the transverse cross section of the whisker-like active material in the region 107b is circular when the whisker-like active material has a cylindrical or conical shape, and is polygonal when the whisker-like active material has a prismatic or pyramidal shape. It is preferable that the longitudinal directions of the whisker-like active materials be not the same because in that case, one of the whisker-like active materials is likely to be entangled with the other, so that separation (or detachment) of the whisker-like active materials does not easily occur in charging/discharging.

Note that the direction in which the whisker-like active material extends is referred to as the longitudinal direction, and the cross-sectional shape of the whisker-like active material cut along a surface perpendicular to or substantially perpendicular to the longitudinal direction is referred to as a longitudinal cross-sectional shape. In addition, a cross-sectional shape of the whisker-like active material cut along a surface perpendicular to or substantially perpendicular to the longitudinal direction of the whisker-like active material is referred to as a transverse cross-sectional shape.

The width of the core 109 in a transverse cross section is greater than or equal to 50 nm and less than or equal to 3 μm, preferably greater than or equal to 0.5 μm and less than or equal to 2 μm.

There is no particular limitation on the length of the core 109 but may be greater than or equal to 0.5 μm and less than or equal to 1000 μm, preferably greater than or equal to 1 μm and less than or equal to 100 μm.

The width of the whisker-like active material in the region 107b in a transverse cross section is greater than or equal to 50 nm and less than or equal to 10 µm, preferably greater than or equal to 0.5 µm and less than or equal to 5 µm. The length of the whisker-like active material in the region 107b is greater than or equal to 1 µm and less than or equal to 1000 µm, preferably greater than or equal to 6 µm and less than or equal to 200 µm.

Note that a "length" of the whisker-like active material means a distance between the tip of the whisker-like active material and the region 107a in the longitudinal direction passing through the center of the whisker-like active material.

Further, the structure of the whisker-like active material is not limited to the above-described structure; the whole of the region 107a and the region 107b may have a structure having crystallinity, or the whole of the region 107a and the region 107b may have an amorphous structure.

In the electrode 100 illustrated in FIG. 1A, part of the region 107a (a region other than the region where the stress-relieving layer 102 is in contact with the core 109) has an amorphous structure like the outer shell 111. Further, the region 107a may include a structure having crystallinity. Furthermore, the region 107a may include a material of the stress-relieving layer 102.

As the stress-relieving layer 102 formed between the current collector 101 and the active material layer 108, a layer having internal stress in a direction different from that of internal stress of the active material layer 108 with respect to the current collector 101 is used. For example, in the case where the active material layer 108 has tensile stress, a layer having compressive stress is used as the stress-relieving layer 102. When the direction of the internal stress of the active material layer 108 with respect to the current collector 101 is different from that of the internal stress of the stress-relieving layer 102 with respect to the current collector 101, bending of the current collector 101 can be suppressed.

Thus, the thickness of the current collector 101 can be small, that is, less than or equal to 100 µm, preferably less than or equal to 50 µm, more preferably less than or equal to 30 µm.

Figure 1B:
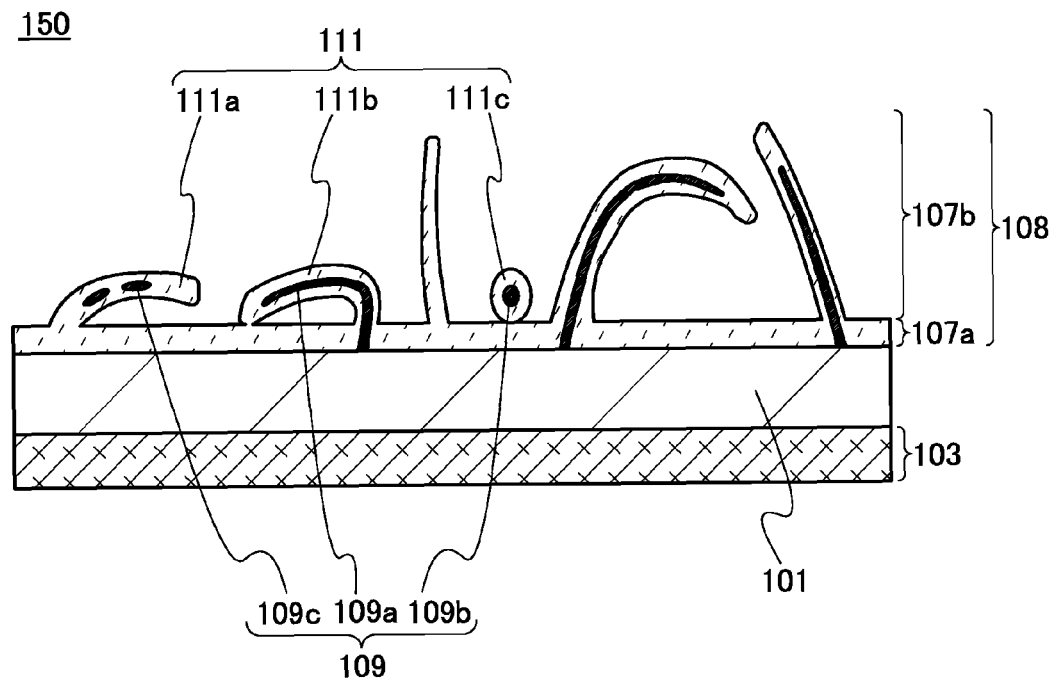

FIG. 1B is a schematic cross-sectional view of part of a surface of an electrode 150. The electrode 150 includes a stress-relieving layer 103, the current collector 101 over the stress-relieving layer 103, and an active material layer 108 over the current collector 101. In other words, the electrode 150 has a structure in which the current collector 101 is provided between the stress-relieving layer 103 and the active material layer 108.

As the stress-relieving layer 103, a layer having internal stress whose direction is the same as that of the internal stress of the active material layer 108 with respect to the current collector 101 is used. For example, in the case where the active material layer 108 has tensile stress, a layer having tensile stress is also used as the stress-relieving layer 103. When a layer having stress whose direction is the same as that of the stress of the active material layer 108 is used as the stress-relieving layer 103, bending of the current collector 101 can be suppressed.

Thus, the thickness of the current collector 101 can be small, that is, less than or equal to 100 µm, preferably less than or equal to 50 µm, more preferably less than or equal to 30 µm.

Further, when the active material layer 108 and the stress-relieving layer 102 or 103 have stress with almost the same absolute values, bending of the current collector can be further suppressed. Specifically, the absolute values of the stress of the active material layer 108 and the stress of the stress-relieving layer 102 or 103 are each set to ±50%, preferably ±20%, more preferably ±10% of the average absolute value. The values of the stress of the active material layer 108, the stress-relieving layer 102, and the stress-relieving layer 103 can be determined depending on the film formation conditions or film thicknesses of the layers.

With the use of the electrode disclosed in this specification, the productivity of a power storage device can be improved. Further, with the use of the electrode disclosed in this specification, the size of a power storage device can be reduced. Furthermore, an active material is hardly separated in the electrode disclosed in this specification; therefore, a highly reliable power storage device can be provided.

When graphene is provided in contact with an active material layer including a whisker, an electrode for a power storage device whose charging/discharging capacity can be improved can be provided. With the use of the electrode, a power storage device having improved charging/discharging capacity can be provided.

Figure 2A:
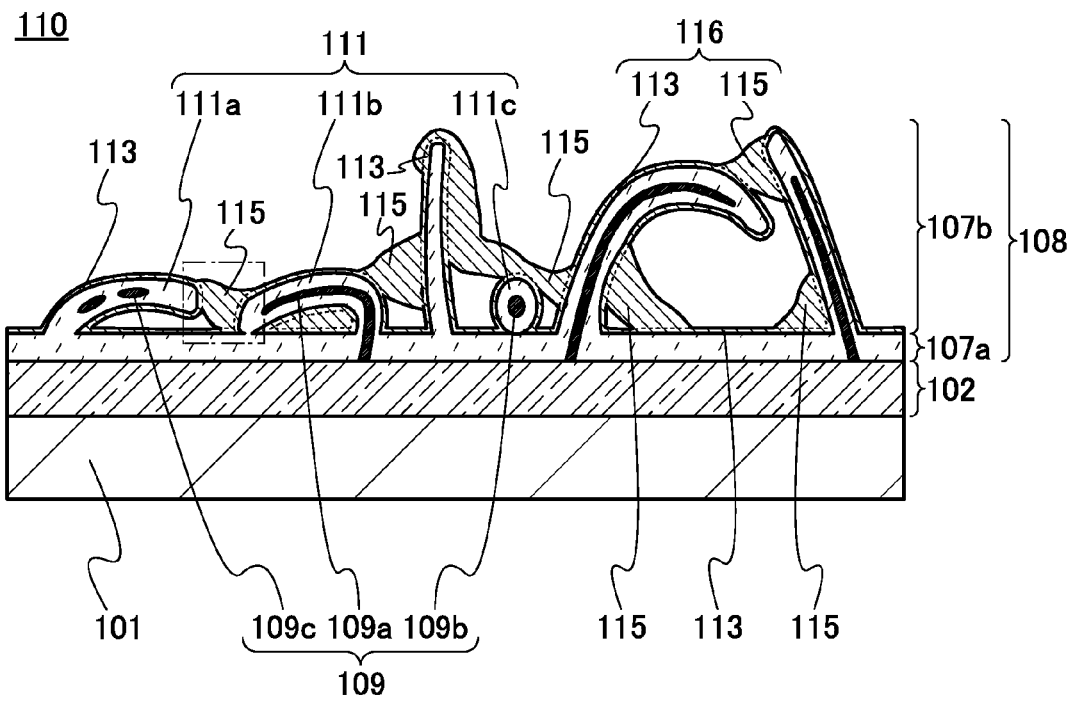
FIGS. 2A and 2B are cross-sectional views each illustrating a surface of an electrode for a power storage device according to one embodiment of the present invention.

An electrode 110 in FIG. 2A has a structure in which a graphene 116 is provided over the electrode 100. An electrode 160 in FIG. 2B has a structure in which the graphene 116 is provided over the electrode 150. In addition, the graphene 116 includes a first region 113 and a second region 115.

In this specification, graphene refers to a one-atom-thick sheet of carbon molecules having a hole through which ions can pass and $sp^2$ bonds. Further, graphite refers to plural graphene sheets bonded to one another by the Van der Waals force. Among elements included in the graphene, the proportion of elements other than hydrogen and carbon is preferably 15 atomic % or lower, or the proportion of elements other than carbon is preferably 30 atomic % or lower.

The first region 113 covers the plurality of whisker-like active materials existing in the region 107b. In detail, the first region 113 also covers a surface of the region 107a as well as surfaces of the plurality of whisker-like active materials existing in the region 107b. Further, the thickness of the first region 113 is not uniform in the whole area and may be uneven.

The second region 115 is provided between a first region 113 at a top of one of the whisker-like active materials and a first region 113 at a top or a side of another one of the whisker-like active materials. Moreover, the first region 113 and the second region 115 are in contact with each other in a given region of the active material layer 108. Therefore, in a plan view of the active material layer 108, the graphene 116 is spread continuously over the plurality of whisker-like active materials (not illustrated).

In other words, the graphene 116 is spread uniformly in the plane direction of the active material layer 108 and in contact with the whisker-like active material. Note that in this specification, the top of a whisker-like active material refers to a region including at least a vertex and a top surface in the region 107b. That is, the top includes at least a region including a side of the whisker-like active material. Further, the thickness of the second region 115 is not uniform in the whole area and may be uneven.

Figure 2B:
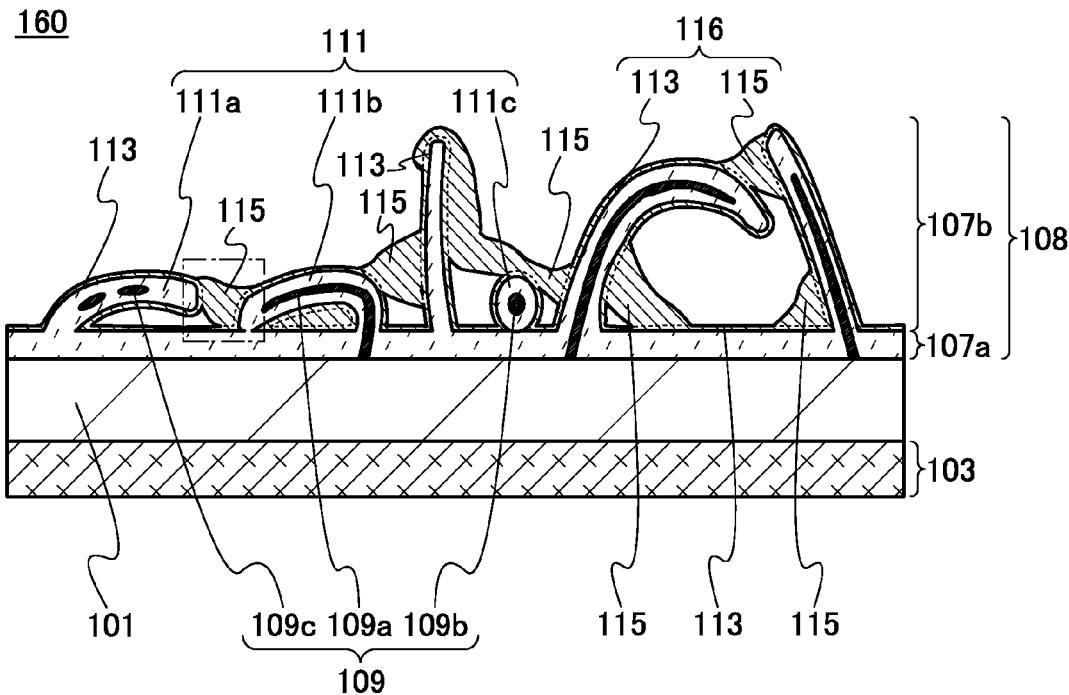

Note that in the graphene 116, the interface between the first region 113 and the second region 115 is not clear. In FIGS. 2A and 2B, in a region where the first region 113 is bonded to the second region 115, the first region 113 and the second region 115 are individually illustrated by dotted lines for clarity.

As illustrated in dashed dotted lines in FIGS. 2A and 2B, the second region 115 in the graphene 116 may be provided between a first region 113 at a side of one of the whisker-like active materials and a first region 113 at a surface of the region 107a.

Further, the active material layer 108 may have a structure in which an oxide film is provided between the first region 113 and the plurality of whisker-like active materials. However, in terms of conductivity of the electrode 110 and the electrode 160, the oxide film is preferably not provided.

The graphene 116 is highly flexible and in contact with the plurality of whisker-like active materials. Therefore, in the electrodes 110 and 160 each including the graphene 116 in the active material layer 108, even if the volume of the whisker-like active material is changed due to occlusion and release of ions, the graphene 116 relieves stress caused by the change in volume, so that pulverization and separation of the whisker-like active material due to repeated charge/discharge cycles can be prevented. Moreover, the graphene 116 has high mechanical strength; therefore, bending and collapsing (also pulverization and separation) of the whisker-like active material by physical impact can be prevented in the electrodes 110 and 160 each including the graphene 116. Therefore, by using the electrode 110 or 160, a decrease in charge/discharge capacity by physical impact or repeated charge/discharge cycles can be suppressed, so that a power storage device having higher cycle characteristics can be manufactured.

Further, the graphene 116 has high conductivity (electron mobility) and is in contact with the whisker-like active material, whereby in each of the electrodes 110 and 160, the graphene 116 can function as a conduction auxiliary agent. That is, the graphene 116 becomes a conduction path of electrons generated due to occlusion and release of ions. This is because the electrode 110 and the electrode 160 are superior in conductivity. Therefore, by using the electrode 110 or 160, high speed charge/discharge can be performed, and a power storage device with higher charge/discharge capacity can be manufactured.

Further, the graphene 116 is in contact with the whisker-like active material, whereby, for example, even when the whisker-like active material is bent or collapsed (also pulverized or separated), the state where the whisker-like active material is in contact with the graphene 116 is maintained, so that the conduction path of electrons in the electrode is not interrupted and electrons can be collected through the graphene 116. That is, even when the whisker-like active material is bent or collapsed (also pulverized or separated), a decrease in conductivity between the current collector 101 and the active material layer 108 (consequently conductivity of the electrode 110 or 160) can be suppressed. In particular, the graphene 116 is spread uniformly in the plane direction of the active material layer 108 (the active material layer including a whisker) and widely in contact with the active material layer 108. This is advantageous for suppression of the decrease in the conductivity. Therefore, by using the electrode 110 or 160, a decrease in charge/discharge capacity by physical impact or by repetition of charge/discharge cycles can be suppressed, so that a power storage device having higher cycle characteristics can be manufactured.

Further, because the graphene 116 itself has a capacity so that ions can be occluded, each of the electrodes 110 and 160 with the graphene 116 functions as an electrode with higher capacity than that without the graphene 116. In addition, the capacity of the graphene 116 has variation depending on the shape of the graphene 116. For example, the area of the graphene 116 is larger when the graphene 116 is uniformly spread in the plane direction of the active material layer 108 in a plane view of the active material layer 108 than that when the active material layer 108 has some holes (also referred to as spaces) in the plane view of the active material layer 108. Similarly to the above, the thickness of the graphene 116 is larger when the graphene 116 is uniformly spread in the plane direction of the active material layer 108 in the plane view of the active material layer 108. In other words, it is advantageous that the graphene 116 is uniformly spread in the plane direction of the active material layer 108 in the plane view of the active material layer 108, because the capacity of the graphene 116 itself is improved and the electrode can function as an electrode with high capacity. Therefore, with the use of the electrode 110 or 160, a power storage device with improved charging/discharging capacity can be manufactured.

Further, in each of the electrodes 110 and 160, the graphene 116 is in contact with the plurality of whisker-like active materials, whereby it can be said that the graphene 116 ties the plurality of whisker-like active materials. That is, the graphene 116 also functions as a binder. As described above, each of the electrodes 110 and 160 is formed without a known conduction auxiliary agent (such as acetylene black) or a binder. As a result, each of the electrodes 110 and 160 can increase the volume or weight proportion of the active material layer 108 in the electrode, so that the electrodes 110 and 160 each function as an electrode with high capacity. Therefore, with the use of the electrode 110 or 160, a power storage device with higher charge/discharge capacity can be manufactured.

Further, the graphene 116 also has high heat resistance. Therefore, the concentration of moisture in each of the electrodes 110 and 160 can be reduced by heat treatment. Moreover, in the case where the electrode 110 or 160 is included in the power storage device, the graphene 116 of the electrode is less capable of absorbing an electrolyte solution, so that deformation or breakdown of the electrode due to swelling of the graphene 116 hardly occurs.

Next, a method for manufacturing the electrode 100 will be described.

For the current collector 101, a conductive material having a foil shape, a plate shape, a net shape, or the like is used. For the current collector 101, a material having high conductivity such as a metal element selected from platinum, copper, titanium, chromium, gold, tungsten, molybdenum, nickel, and the like or an alloy including any of the above metal elements is preferably used. Note that as a material of the current collector 101, an aluminum alloy to which an element which improves heat resistance, such as silicon, titanium, neodymium, scandium, or molybdenum, is added may be used. In addition, the current collector 101 can have a single-layer structure or a stacked structure having two or more layers.

The stress-relieving layer 102 is formed over the current collector 101. For the stress-relieving layer 102, an insulating material may be used, but a conductive material is preferably used. The stress-relieving layer 102 can be formed by a method such as a printing method, a sol-gel method, a coating method, an ink-jet method, a CVD method, a sputtering method, or an evaporation method as appropriate. Alternatively, the stress-relieving layer 102 may be formed by roll-to-roll processing.

For the stress-relieving layer 102, a material having high conductivity such as a metal element selected from copper, titanium, chromium, gold, tungsten, molybdenum, nickel, and the like or an alloy including any of the above metal elements can be used. Alternatively, the stress-relieving layer 102 may be formed using a metal element that forms silicide by reacting with silicon. Examples of the metal element which forms silicide by reacting with silicon include zirconium, titanium, hathium, vanadium, niobium, tantalum, chromium, molybdenum, tungsten, cobalt, and nickel. The stress-relieving layer 102 can have a single-layer structure or a stacked structure having two or more layers.

For the stress-relieving layer 102, a crystalline semiconductor, a non-single-crystal semiconductor typified by amorphous silicon or polycrystalline silicon, a compound semiconductor such as GaAs or CdTe, or an oxide semiconductor such as ZnO or InGaZnO may be used. Alternatively, graphene or carbon nanotube may be used for the stress-relieving layer 102.

Appropriate adjustment of the formation conditions or the thickness of the stress-relieving layer 102 enables the stress-relieving layer 102 to have given internal stress. For example, as the stress-relieving layer 102, a tungsten layer having compressive stress is formed by a sputtering method. Specifically, a tungsten layer with a thickness of 60 nm is formed under the following conditions: the distance between the current collector 101 and a tungsten target is 60 mm; the substrate temperature is 230° C.; the pressure is 0.2 Pa; the direct current (DC) power source is 1.0 kW; and the sputtering gas is an argon gas.

Next, the active material layer 108 is formed over the stress-relieving layer 102. As a material of the active material layer 108, tin, silicon, aluminum, germanium, titanium, or an alloy including any of them can be used.

In this embodiment, a silicon layer is formed by an LPCVD method as the active material layer 108. The temperature in formation of the active material layer 108 is higher than 400° C. and is a temperature which an LPCVD apparatus, the current collector 101, and the stress-relieving layer 102 or 103 can withstand, preferably higher than or equal to 500° C. and lower than 580° C. A deposition gas containing silicon is used as the source gas. Examples of the deposition gas containing silicon include silicon hydride, silicon fluoride, and silicon chloride; typically, $SiH_4$, $Si_2H_6$, $SiF_4$, $SiCl_4$, $Si_2Cl_6$, and the like are given. Note that one or more of rare gases such as helium, neon, argon, and xenon and hydrogen may be mixed in the source gas.

Furthermore, in the formation of the active material layer including a whisker, the pressure is preferably higher than or equal to 10 Pa and lower than or equal to 1000 Pa, more preferably higher than or equal to 20 Pa and lower than or equal to 200 Pa.

Further, when the flow rate of the deposition gas containing silicon is high, the deposition rate becomes high, so that silicon of the active material layer 108 is likely to have an amorphous structure. When the flow rate of the deposition gas containing silicon is low, the deposition rate becomes low, so that silicon of the active material layer 108 is likely to have a crystalline structure. Thus, the flow rate of the deposition gas containing silicon may be appropriately determined in consideration of the deposition rate and the like. For example, the flow rate of the deposition gas containing silicon may be greater than or equal to 300 sccm and less than or equal to 1000 sccm.

Note that oxygen is contained as an impurity in the active material layer 108 in some cases. This is because oxygen is released from a quartz chamber of the LPCVD apparatus in the heating for forming the crystalline silicon layer as the active material layer 108 by an LPCVD method, and is diffused into the crystalline silicon layer.

Note that an impurity element imparting one conductivity type, such as phosphorus or boron, may be added to the active material layer 108. The active material layer 108 to which the impurity element imparting one conductivity type, such as phosphorus or boron, is added has higher conductivity, so that the conductivity of the electrode can be increased. Therefore, the discharge capacity or the charge capacity can be further increased.

When the silicon layer is formed as the active material layer 108 by an LPCVD method, a low-density region is not formed between the stress-relieving layer 102 and the active material layer 108, electrons transfer easily at the interface between the stress-relieving layer 102 and the silicon layer, and the adhesion can be increased. One of the reasons is that active species of the source gas are supplied to the silicon layer that is being deposited in a step of forming the silicon layer, so that silicon diffuses into the stress-relieving layer 102 from the silicon layer. Even if a region (a sparse region) lacking in silicon is formed, the active species of the source gas are continuously supplied to the region; therefore, a low-density region is unlikely to be formed in the silicon layer. In addition, since the silicon layer is formed over the stress-relieving layer 102 by vapor-phase growth, throughput can be improved.

In particular, the region 107a having an amorphous structure is more adaptable to a surface of the stress-relieving layer 102, on which the region 107a is formed, than the region 107a having a crystalline structure. In other words, the region 107a having an amorphous structure is more likely to be formed so as to be compatible with the surface of the stress-relieving layer 102. Further, in the case where the electrode disclosed in this embodiment is included in a power storage device, the electrode is resistant to change in volume due to occlusion and release of ions (e.g., relieves stress caused by expansion in volume), pulverization or separation of the active material layer 108 (particularly a whisker) due to repeated charge/discharge cycles can be prevented; thus, a power storage device with more improved cycle characteristics can be manufactured.

The region 107a having a crystalline structure has excellent conductivity and ion mobility; therefore, the conductivity of the entire active material layer 108 can be further improved. In other words, in the case where the electrode disclosed in this embodiment is included in a power storage device, charge and discharge can be performed at higher speed, and a power storage device with more improved charge/discharge capacity can be manufactured.

In the electrode 100, the active material layer 108 has a larger surface area than a plate-like active material layer due to the projecting region 107b. That is, in the case where the electrode 100 is included in a power storage device, charge and discharge can be performed at high speed, and a power storage device with improved charge/discharge capacity can be manufactured.

The stress-relieving layer 103 included in the electrode 150 may be provided before the active material layer 108 is formed or after the active material layer 108 is formed. The stress-relieving layer 103 may be formed using an insulating material or a conductive material. The stress-relieving layer 103 can be formed using the same material and method as those of the stress-relieving layer 102. The stress-relieving layer 103 can be formed using an inorganic material such as silicon oxide, silicon nitride, silicon oxynitride, silicon nitride oxide, aluminum oxide, aluminum nitride, aluminum oxynitride, or aluminum nitride oxide or an organic material such as polypropylene, polyimide, polyethylene, an acrylic resin, or a fluorine resin.

Appropriate adjustment of the formation conditions or the thickness of the stress-relieving layer 103 enables the stress-relieving layer 103 to have given internal stress. For example, as the stress-relieving layer 103, a silicon nitride layer having tensile stress is formed by a plasma CVD method. Specifically, a 50-nm-thick silicon nitride layer is formed under the following conditions: the distance between electrodes is 22.2 mm; the substrate temperature is 325° C.; the pressure is 160 Pa; the high-frequency power is 0.15 kW (13.56 MHz); and the flow ratio of the source gas is $SiH_4:NH_3:N_2:H_2=40:240:300:60$ (sccm).

Next, methods for manufacturing the electrode 110 and the electrode 160 will be described. The electrode 110 can be manufactured in such a manner that the graphene 116 is provided in contact with the active material layer 108 after the electrode 100 is manufactured. The electrode 160 can be manufactured in such a manner that that graphene 116 is provided in contact with the active material layer 108 after the electrode 150 is manufactured.

First, a graphite oxide solution in which graphite oxide obtained by oxidizing graphite is dispersed is prepared. In this embodiment, the graphite oxide is formed by an oxidation method called a Hummers method. The Hummers method is as follows. A sulfuric acid solution of potassium permanganate, oxygenated water, or the like is mixed into single crystal graphite powder to cause oxidation reaction; thus, a graphite oxide solution is formed. Graphite oxide contains a functional group such as a carbonyl group, a carboxyl group, or a hydroxyl group due to oxidation of carbon in graphite. Accordingly, the interlayer distance of graphite oxide is longer than that of graphite. Then, ultrasonic vibration is transferred to the graphite oxide solution, so that the graphite oxide whose interlayer distance is long is cleaved to give the solution in which the graphene oxide is dispersed (a graphene oxide solution), and the solvent is removed, whereby the graphene oxide is obtained.

Graphene oxide is dispersed in a solvent such as water or N-methylpyrrolidone (NMP), so that the graphene oxide solution is obtained. The solvent is preferably a polar solvent. The concentration of graphene oxide may be 0.1 g to 10 g per liter. In a solution having polarity, different graphene oxides are not easily aggregated because oxygen contained in the functional group is negatively charged. Further, a solution in which commercial graphene oxide is dispersed in a solvent or a commercial graphene oxide solution can be used. The length of one side (also referred to as a flake size) of graphene oxide which is used may be preferably less than or equal to 10 μm.

Next, the graphene oxide solution is applied to the active material layer 108. As a method of applying the graphene oxide solution to the active material layer 108, a coating method, a spin coating method, a dip coating method, a spray method, an electrophoresis method, or the like may be employed. Alternatively, these methods may be combined as appropriate to be employed. For example, after the graphene oxide solution is applied to a base by a dip coating method, the base is rotated as in a spin coating method, so that the evenness of the thickness of the graphene oxide solution can be improved.

Thus, in the case where an active material layer having a complex curved surface or unevenness such as the active material layer 108 is provided with the graphene oxide, an electrophoresis method is preferably used. Here, the case of using an electrophoresis method will be described below.

Figure 3:
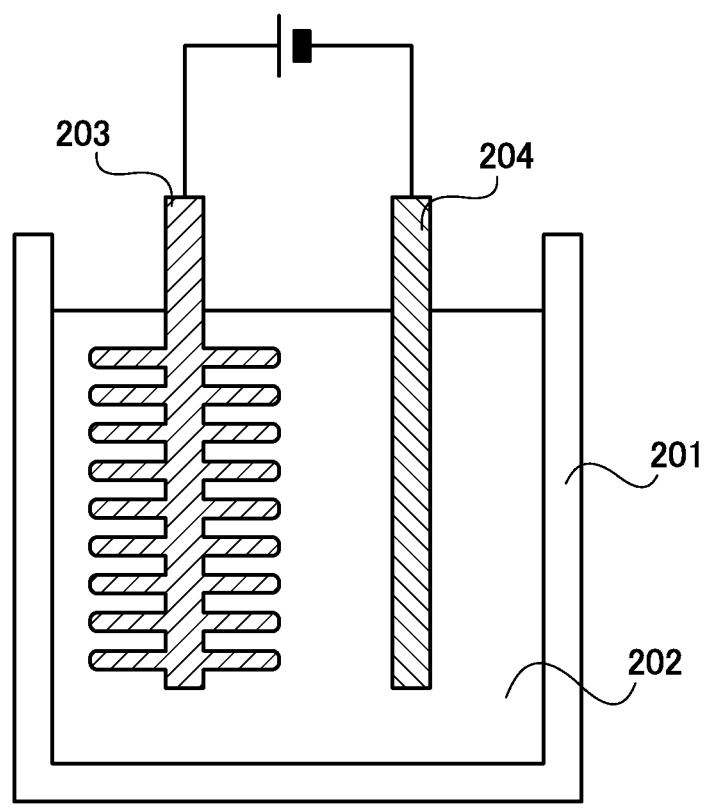
FIG. 3 is a cross-sectional view illustrating an electrophoresis method.

FIG. 3 is a cross-sectional view illustrating an electrophoresis method. In a container 201, the solution in which graphene oxide is dispersed and which is obtained by the above method (hereinafter, referred to as a graphene oxide solution 202) is contained. Further, a formation subject 203 is put in the graphene oxide solution 202 and is used as an anode. In addition, a conductor 204 serving as a cathode is put in the graphene oxide solution 202. Note that the formation subject 203 refers to the active material layer including a whisker, which is formed above the current collector 101. Further, the conductor 204 may be formed using a conductive material, for example, a metal material or an alloy material.

By applying appropriate voltage (e.g., 5 V to 20 V) between the anode and the cathode, a graphene oxide layer is formed over a surface of the formation subject 203, that is, the surface of the active material layer including a whisker. This is because the graphene oxide is negatively charged in the polar solvent as described above, so that by applying voltage, the graphene oxide which is negatively charged is drawn to the anode and deposited on the formation subject 203. Note that the voltage which is applied is not necessarily constant. Further, by measuring the amount of charge flowing between the anode and the cathode, the thickness of a graphene oxide layer deposited on the object can be estimated.

When the graphene oxide layer with a necessary thickness is obtained, the formation subject 203 is taken out of the graphene oxide solution 202 and dried.

When a graphene oxide layer is formed on the surface of the formation subject 203 by an electrophoresis method, graphene oxide is hardly stacked over a portion of the formation subject 203, which is already covered with graphene oxide, due to sufficiently low conductivity of graphene oxide. However, the graphene oxide is stacked preferentially over a portion which is not yet covered with a graphene oxide, whereby the thickness of the graphene oxide formed over the surface of the formation subject 203 is practically uniform. Note that the graphene oxide formed over the surface of the formation subject 203 becomes the first region 113 of each of the electrodes 110 and 160 by reduction treatment described below.

Moreover, when electrophoresis is performed for a longer time than time required for covering the surface of the formation subject 203 with graphene oxide, the graphene oxide which has already covered the surface of the formation subject 203 and other graphene oxide which is dispersed in the graphene oxide solution 202 repel each other. As a result, the graphene oxide does not extend nor grow so as to cover the surface of the active material layer including a whisker, but the graphene oxide extends and grows like the second region 115 of each of the electrodes 110 and 160. That is, in the active material layer including a whisker, the graphene oxide is formed between a first region 113 at a top of one of the whiskers and a first regions 113 at a top or a side of another one of the whiskers. The graphene oxide which extends and grows becomes the second region 115 of each of the electrodes 110 and 160 by reduction treatment described below.

Time for performing electrophoresis (time for applying voltage) is preferably longer than time for covering the surface of the formation subject 203 with the graphene oxide, for example, longer than or equal to 0.5 minutes and shorter than or equal to 30 minutes, more preferably longer than or equal to 5 minutes and shorter than or equal to 20 minutes.

Then, part of oxygen is released from the graphene oxide by reduction treatment. As reduction treatment, the graphene oxide is heated at 150° C. or higher, preferably 200° C. or higher in a vacuum or in a reducing atmosphere such as an inert gas (nitrogen, a rare gas, or the like) atmosphere. By being heated at a higher temperature and for a longer time, graphene oxide is reduced to a higher extent so that graphene 116 with high purity (i.e., with a low concentration of elements other than carbon) can be obtained. The temperature for heating has to be determined in consideration of reactivity between the graphene oxide and the formation subject 203. Note that graphene oxide is known to be reduced at 150° C.

Further, when heat treatment is performed at a higher temperature and for a longer time, more defects are repaired and the conductivity is improved. From the inventors' measurements, for example, the graphene oxide over a glass substrate is heated and reduced to be graphene, so that resistivity of the graphene is approximately 240 MΩcm at a heating temperature of 100° C. (for one hour), approximately 4 kΩcm at a heating temperature of 200° C. (for one hour), and approximately 2.8 Ωcm at a heating temperature of 300° C. (for one hour). Note that each resistivity is an average value of eight samples measured by the Van der Pauw method.

Since graphite is treated with a sulfuric acid solution of potassium permanganate according to the Hummers method, a functional group such as a sulfone group is also bonded to the graphite oxide, and the release (decomposition) of the functional group is performed at around 300° C. Therefore, reduction treatment is preferably performed at higher than or equal to 300° C.

Depending on the temperature of reduction treatment, the conductivity of the graphene changes as described above; the same can also apply to its flexibility, mechanical strength, and the like. The temperature of the reduction treatment may be determined in accordance with the required conductivity, flexibility, mechanical strength, and the like. In the case where the conductivity of graphene used as a binder is not sufficiently high, a known conduction auxiliary agent (such as acetylene black) is preferably added at a required amount so as to compensate the conductivity.

Through the above reduction treatment, the formed graphene oxide becomes the graphene 116. At that time, in the graphene 116, adjacent graphenes are bonded to form a larger net-like or sheet-like network, so that the first region 113 and the second region 115 are formed. In particular, the first region 113 is formed with a substantially uniform thickness even at the surface of the active material layer having a complex curved surface or unevenness.

Therefore, in a given region of the active material layer 108, the first region 113 and the second region 115 are in contact with each other, and the graphene 116 is continuously spread over the active material layer 108 in the plane view of the active material layer 108. In other words, the graphene 116 is uniformly spread in the plane direction of the active material layer including a whisker and is formed in contact with the whisker-like active material.

Further, the second region 115 of each of the electrodes 110 and 160 can be formed by only a dip coating method. However, with a dip coating method, the active material layer having a complex curved surface or unevenness may fail to be efficiently soaked in the graphene oxide solution. Thus, after the first region 113 is formed by performing the above electrophoresis method for a short time (e.g., about 0.5 minutes), a dip coating method is performed, whereby the electrodes 110 and 160 can be formed more efficiently than the case of only a dip coating method is performed.

Through the above steps, the active material layer 108 can be formed. It is preferable that steps from the step of forming the active material layer 108 to the step of forming the graphene 116 (in particular, the step of forming the graphene oxide) be performed in an atmosphere in which the surface of the active material layer 108 is not oxidized. This is because the oxide film may be formed between the active material layer 108 and the first region 113 and decreases the conductivity of each of the electrodes 110 and 160.

Through the above steps, an electrode for a power storage device with good cycle characteristics and high charge/discharge capacity can be manufactured.

Although the electrode described in this embodiment is shown as the electrode for a power storage device, the electrode described in this embodiment may be used for other applications. For example, an active material layer of the electrode may be used for a photoelectric conversion layer of a photoelectric conversion device, and the active material layer may be used for an antireflective film.

Note that this embodiment can be implemented in appropriate combination with any of the structures described in the other embodiments.

(Embodiment 2)

In this embodiment, a power storage device including the electrode described in the above embodiment will be described.

The power storage device described in this embodiment includes at least a positive electrode, a negative electrode, a separator, and an electrolyte solution. The electrode described in Embodiment 1 is used as the negative electrode.

The electrolyte solution is a nonaqueous solution containing an electrolyte salt or a solution containing an electrolyte salt. Any electrolyte salt can be used as the electrolyte salt as long as it contains carrier ions such as alkali metal ions, alkaline earth metal ions, beryllium ions, or magnesium ions. Examples of the alkali metal ions include lithium ions, sodium ions, and potassium ions. Examples of the alkaline earth metal ions include calcium ions, strontium ions, and barium ions. In this embodiment, an electrolyte salt containing lithium ions (hereinafter referred to as a lithium-containing electrolyte salt) is used as the electrolyte salt.

With the above structure, a lithium-ion secondary battery or a lithium-ion capacitor can be formed. Alternatively, when only a solvent is used for the electrolyte solution without using an electrolyte salt, an electric double layer capacitor can be formed.

Here, a lithium-ion secondary battery will be described with reference to drawings.

Figure 4A:
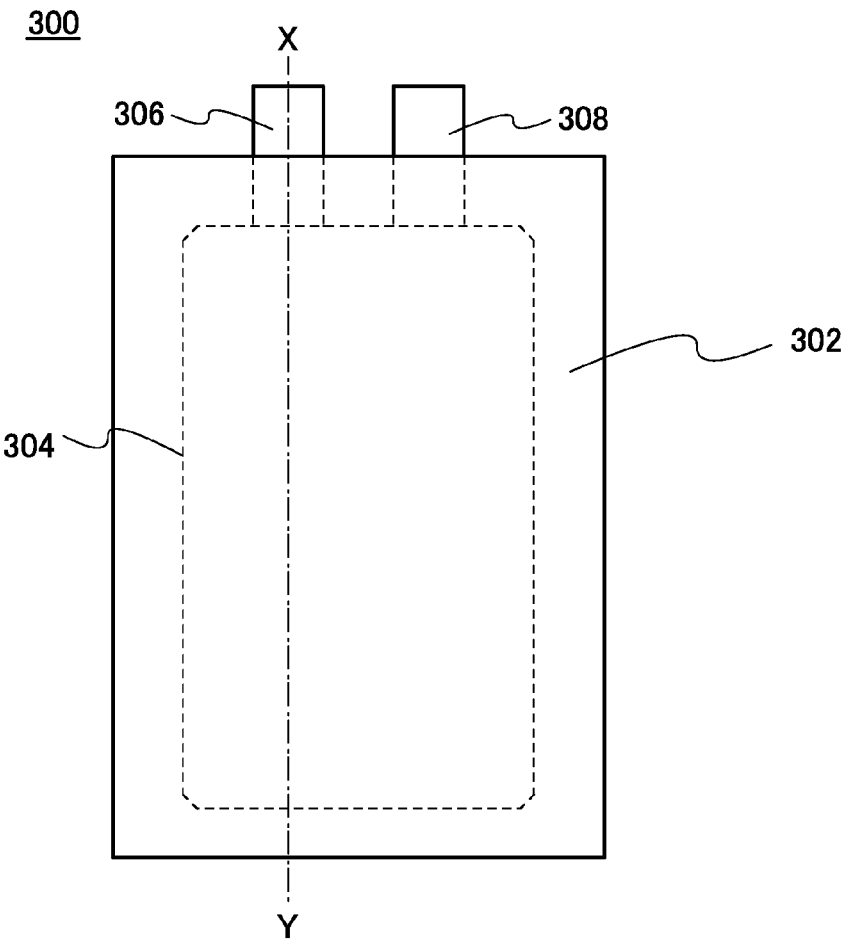
FIGS. 4A and 4B are a plan view and a cross-sectional view illustrating one embodiment of a power storage device.
Figure 4B:
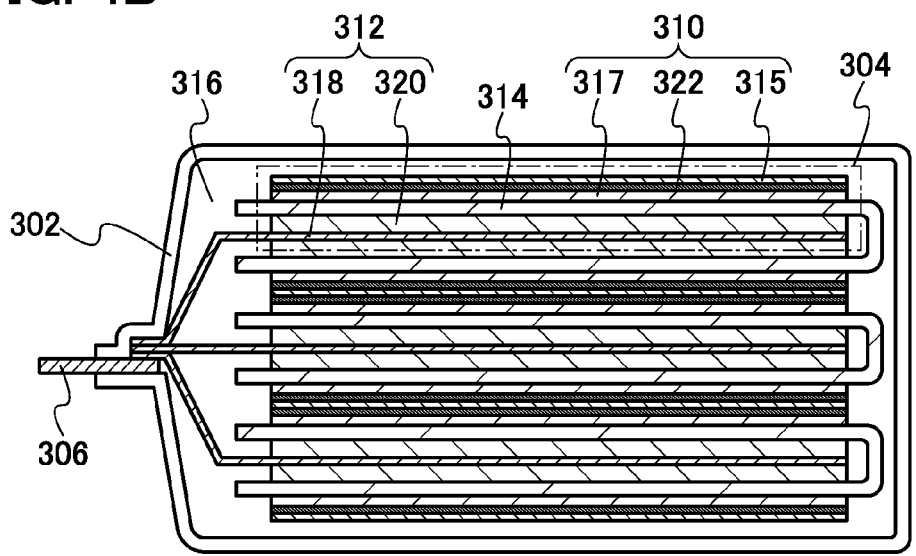

FIGS. 4A and 4B illustrate an example of a structure of a power storage device 300. FIG. 4B is a cross-sectional view along dashed dotted line X-Y in FIG. 4A.

The power storage device 300 in FIGS. 4A and 4B includes a power storage cell 304 in an exterior member 302. The power storage device 300 further includes terminal portions 306 and 308 which are connected to the power storage cell 304. The power storage cell 304 includes a negative electrode 310, a positive electrode 312, and a separator 314 between the negative electrode 310 and the positive electrode 312.

Further, the power storage device 300 includes an electrolyte solution 316 with which the exterior member 302 is filled. For the exterior member 302, a laminate film, a polymer film, a metal film, a metal case, a plastic case, or the like can be used.

The negative electrode 310 includes a negative electrode current collector 315, a negative electrode active material layer 317, and a stress-relieving layer 322. In this embodiment, the negative electrode active material layer 317 is formed on one or both of surfaces of the negative electrode current collector 315 with the stress-relieving layer 322 provided therebetween. The negative electrode current collector 315 is connected to the terminal portion 308, and part of the terminal portion 308 extends outside the exterior member 302.

The positive electrode 312 includes a positive electrode current collector 318 and a positive electrode active material layer 320. In this embodiment, the positive electrode active material layer 320 is formed on one or both of surfaces of the positive electrode current collector 318. Further, the positive electrode 312 may include a binder and a conduction auxiliary agent besides the positive electrode current collector 318 and the positive electrode active material layer 320. The positive electrode current collector 318 is connected to the terminal portion 306. Part of the terminal portion 306 extends outside the exterior member 302.

Although a sealed thin power storage device is described as the power storage device 300 in this embodiment, the external shape of the power storage device 300 is not limited thereto. A power storage device having any of a variety of shapes, such as a button power storage device, a cylindrical power storage device, or a rectangular power storage device, can be used as the power storage device 300. Further, although the structure where a plurality of the power storage cells 304 are stacked is described in this embodiment, the number of the power storage cells 304 used for the power storage device 300 may be one. A structure where one or a plurality of the power storage cells 304 used for the power storage device 300 are rolled may be employed.

For the positive electrode current collector 318, a conductive material such as aluminum or stainless steel which is processed into a foil shape, a plate shape, a net shape, or the like can be used. Alternatively, a conductive layer provided by deposition separately on a substrate and then separated from the substrate can be used as the positive electrode current collector 318.

The positive electrode active material layer 320 can be formed using any of $LiFeO_2$, $LiCoO_2$, $LiNiO_2$, $LiMn_2O_4$, $LiFePO_4$, $LiCoPO_4$, $LiNiPO_4$, $LiMnPO_4$, $V_2O_5$, $Cr_2O_5$, $MnO_2$, and other lithium compounds as a material. Note that when carrier ions are alkali metal ions other than lithium ions, alkaline earth metal ions, beryllium ions, or magnesium ions, the positive electrode active material layer 320 can be formed using, instead of lithium in the above lithium compounds, an alkali metal (e.g., sodium or potassium), an alkaline earth metal (e.g., calcium, strontium, or barium), beryllium, or magnesium.

The positive electrode active material layer 320 is formed over the positive electrode current collector 318 by a coating method or a physical vapor deposition method (e.g., a sputtering method), whereby the positive electrode 312 can be formed. In the case where a coating method is employed, the positive electrode active material layer 320 is formed in such a manner that a paste in which a conduction auxiliary agent (for example, acetylene black (AB), a binder (e.g., polyvinylidene fluoride (PVDF))), or the like is mixed with any of the above materials for the positive electrode active material layer 320 is applied to the positive electrode current collector 318 and dried. In this case, the positive electrode active material layer 320 is preferably molded by applying pressure as needed.

Note that as the conduction auxiliary agent, any electron-conductive material can be used as long as it does not cause a chemical change in the power storage device. For example, a carbon-based material such as graphite or carbon fibers; a metal material such as copper, nickel, aluminum, or silver; or a powder or fiber of a mixture thereof can be used.

As the binder, polysaccharides such as starch, carboxymethyl cellulose, hydroxypropyl cellulose, regenerated cellulose, and diacetyl cellulose; vinyl polymers such as polyvinyl chloride, polyethylene, polypropylene, polyvinyl alcohol, polyvinyl pyrrolidone, polytetrafluoroethylene, polyvinylidene fluoride, ethylene-propylene-diene monomer (EPDM) rubber, sulfonated EPDM rubber, styrene-butadiene rubber, butadiene rubber, and fluorine rubber; polyether such as polyethylene oxide; and the like can be given.

The positive electrode active material layer 320 may be formed using a paste of a mixture of the positive electrode active material and graphene instead of a conduction auxiliary agent and a binder. Note that an alkali metal such as potassium may be added to the graphene. Further, the graphene can be obtained by producing the graphene oxide through the Hummers method as described in Embodiment 1 and performing reduction treatment.

The use of graphene instead of a conduction auxiliary agent and a binder leads to a reduction in amount of the conduction auxiliary agent and the binder in the positive electrode 312. In other words, the weight of the positive electrode 312 can be reduced; accordingly, the charge/discharge capacity of the lithium-ion secondary battery per unit weight of the electrode can be increased.

Strictly speaking, the term "active material" refers only to a material that relates to insertion and elimination of ions serving as carriers. In this specification, however, in the case of employing a coating method to form the positive electrode active material layer 320, for the sake of convenience, the material of the positive electrode active material layer 320, that is, a substance that is actually a "positive electrode active material", a conduction auxiliary agent, a binder, and the like are collectively referred to as the positive electrode active material layer 320.

As the negative electrode 310, the electrode 100, the electrode 150, the electrode 110, or the electrode 160 which are described in Embodiment 1 can be used. That is, the negative electrode 310 includes the current collector 101 in Embodiment 1 as the negative electrode current collector 315 and the active material layer 108 in Embodiment 1 as the negative electrode active material layer 317. In addition, the stress-relieving layer 102 in Embodiment 1 can be used as the stress-relieving layer 322 in this embodiment.

Note that in each of the electrodes 100 and 150 illustrated in FIGS. 1A and 1B and the electrodes 110 and 160 illustrated in FIGS. 2A and 2B, the active material layer 108 is formed on only one surface of the current collector 101; however, the structure is not limited thereto, and the active material layer 108 may be formed on both of surfaces of the current collector 101. For example, when the active material layer is formed using a silicon semiconductor while the negative electrode current collector 315 is held by a frame-like susceptor in an LPCVD apparatus, the active material layers can be formed on both of surfaces of the negative electrode current collector 315 at the same time. As a result, the number of manufacturing steps can be reduced in the case where both of the surfaces of the negative electrode current collector 315 are used for formation of the electrode. In addition, in the case where the active material layers are formed on both of the surfaces of the negative electrode current collector 315, stress-relieving layers may be formed on both of the surfaces of the negative electrode current collector 315 or formation of the stress-relieving layer can be omitted.

The negative electrode active material layer 317 may be predoped with lithium. Predoping with lithium may be performed in such a manner that a lithium layer is formed on a surface of the negative electrode active material layer 317 by a sputtering method. Alternatively, lithium foil is provided on the surface of the negative electrode active material layer 317, whereby the negative electrode active material layer 317 can be predoped with lithium.

The electrolyte solution 316 is a nonaqueous solution containing an electrolyte salt or a solution containing an electrolyte salt. Particularly in a lithium-ion secondary battery, a lithium-containing electrolyte salt which includes lithium ions serving as carrier ions is used. Typical examples of the electrolyte salt include lithium salts such as $LiClO_4$, $LiAsF_6$, $LiBF_4$, $LiPF_6$, and $Li(C_2F_5SO_2)_2N$. Note that when carrier ions are alkali metal ions other than lithium ions or alkaline earth metal ions, alkali metal salt (e.g., sodium salt or potassium salt), alkaline earth metal salt (e.g., calcium salt, strontium salt, or barium salt), beryllium salt, magnesium salt, or the like can be used as a solute of the electrolyte solution 316.

The electrolyte solution 316 is preferably a nonaqueous solution containing an electrolyte salt. That is, as a solvent of the electrolyte solution 316, an aprotic organic solvent is preferably used. Examples of the aprotic organic solvent include ethylene carbonate, propylene carbonate, dimethyl carbonate, diethyl carbonate, y-butyrolactone, acetonitrile, dimethoxyethane, and tetrahydrofuran, and one or more of these materials can be used. Alternatively, as the aprotic organic solvent, one ionic liquid or a plurality of ionic liquids may be used. Owing to non-flammability and non-volatility of an ionic liquid, it is possible to suppress explosion, inflammation, and the like of the power storage device 300 at the time when the internal temperature of the power storage device 300 rises, resulting in improvement in safety.

When a gelled high-molecular material containing an electrolyte salt is used as the electrolyte solution 316, safety against liquid leakage and the like is improved and the power storage device 300 can be thinner and more lightweight. Examples of the gelled high-molecular material include a silicon gel, an acrylic gel, an acrylonitrile gel, polyethylene oxide, polypropylene oxide, and a fluorine-based polymer.

As the electrolyte solution 316, a solid electrolyte such as $Li_3PO_4$ can be used.

As the separator 314, an insulating porous material is used. For example, paper; nonwoven fabric; a glass fiber; a synthetic fiber such as nylon (polyamide), vinylon (polyvinyl alcohol fiber), polyester, acrylic, polyolefin, or polyurethane; a synthetic resin; or ceramics may be used. Note that a material which does not dissolve in the electrolyte solution 316 needs to be selected.

A lithium-ion secondary battery has a small memory effect, a high energy density, and a high charge/discharge capacity. In addition, the output voltage of the lithium-ion secondary battery is high. Thus, it is possible to reduce the size and weight of the lithium-ion secondary battery. Further, the lithium-ion secondary battery does not easily deteriorate due to repeated charge/discharge cycles and can be used for a long time, leading to a reduction in cost.

In the case where the power storage device described in this embodiment is a lithium-ion capacitor, instead of the positive electrode active material layer 320, a material capable of reversibly inserting and eliminating one of or both lithium ions and anions may be used. Examples of the material include active carbon, graphite, a conductive high molecule, and a polyacene organic semiconductor (PAS).

High adhesion between a current collector and an active material layer of both a positive electrode and a negative electrode in the power storage device described in this embodiment allows an electrode to be bended. Thus, the power storage device can be flexible.

Note that this embodiment can be implemented in appropriate combination with any of the structures described in the other embodiments.

(Embodiment 3)

The power storage device described in the above embodiment can be used for power supplies of a variety of electric appliances which can be operated with power.

Specific examples of electric appliances each utilizing the power storage device described in the above embodiment are as follows: display devices, lighting devices, desktop personal computers and laptop personal computers, image reproduction devices which reproduce still images and moving images stored in recording media such as digital versatile discs (DVDs), mobile phones, portable game machines, portable information terminals, e-book readers, video cameras, digital still cameras, high-frequency heating appliances such as microwave ovens, electric rice cookers, electric washing machines, air-conditioning systems such as air conditioners, electric refrigerators, electric freezers, electric refrigerator-freezers, freezers for preserving DNA, and medical electrical equipment such as dialyzers. In addition, moving objects driven by electric motors using power from power storage devices are also included in the category of electric appliances. Examples of the moving objects include electric vehicles, hybrid vehicles each including both an internal-combustion engine and an electric motor, and motorized bicycles including motor-assisted bicycles.

In the electric appliances, the power storage device described in the above embodiment can be used as a power storage device for supplying enough power for almost the whole power consumption (referred to as a main power supply). Alternatively, in the electric appliances, the power storage device described in the above embodiment can be used as a power storage device which can supply power to the electric appliances when the supply of power from the main power supply or a commercial power supply is stopped (such a power storage device is referred to as an uninterruptible power supply). Still alternatively, in the electric appliances, the power storage device described in the above embodiment can be used as a power storage device for supplying power to the electric appliances at the same time as the power supply from the main power supply or a commercial power supply (such a power storage device is referred to as an auxiliary power supply).

Figure 5:
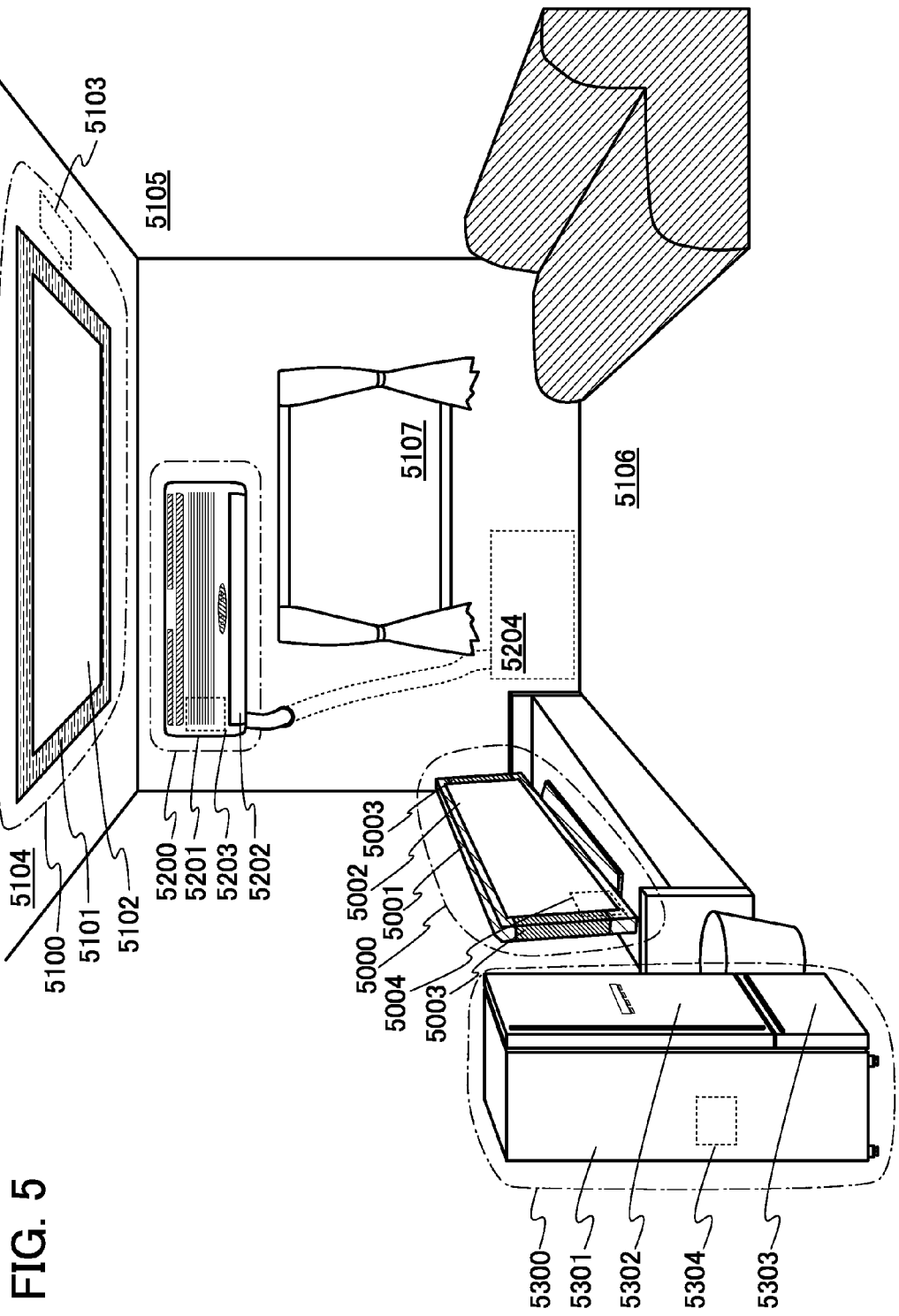
FIG. 5 illustrates application examples of power storage devices.

FIG. 5 illustrates specific structures of the electric appliances. In FIG. 5, a display device 5000 is an example of an electric appliance including the power storage device described in the above embodiment as a power storage device 5004. Specifically, the display device 5000 corresponds to a display device for TV broadcast reception and includes a housing 5001, a display portion 5002, speaker portions 5003, and the power storage device 5004. The power storage device 5004 is provided in the housing 5001. The display device 5000 can receive power from a commercial power supply. Alternatively, the display device 5000 can use power stored in the power storage device 5004. Thus, the display device 5000 can be operated with the use of the power storage device 5004 as an uninterruptible power supply even when power cannot be supplied from a commercial power supply due to power failure or the like.

A semiconductor display device such as a liquid crystal display device, a light-emitting device in which a light-emitting element such as an organic EL element is provided in each pixel, an electrophoresis display device, a digital micromirror device (DMD), a plasma display panel (PDP), or a field emission display (FED) can be used for the display portion 5002.

Note that the display device includes, in its category, all of information display devices for personal computers, advertisement displays, and the like besides TV broadcast reception.

In FIG. 5, an installation lighting device 5100 is an example of an electric appliance including the power storage device described in the above embodiment as a power storage device 5103. Specifically, the lighting device 5100 includes a housing 5101, a light source 5102, a power storage device 5103, and the like. Although FIG. 5 illustrates the case where the power storage device 5103 is provided in a ceiling 5104 on which the housing 5101 and the light source 5102 are installed, the power storage device 5103 may be provided in the housing 5101. The lighting device 5100 can receive power from a commercial power supply. Alternatively, the lighting device 5100 can use power stored in the power storage device 5103. Thus, the lighting device 5100 can be operated with the use of the power storage device 5103 as an uninterruptible power supply even when power cannot be supplied from a commercial power supply due to power failure or the like.

Note that although the installation lighting device 5100 provided in the ceiling 5104 is illustrated in FIG. 5 as an example, the power storage device described in the above embodiment can be used in an installation lighting device provided in, for example, a wall 5105, a floor 5106, or a window 5107 other than the ceiling 5104. Alternatively, the power storage device can be used in a tabletop lighting device or the like.

As the light source 5102, an artificial light source which emits light artificially by using power can be used. Specifically, an incandescent lamp, a discharge lamp such as a fluorescent lamp, and light-emitting elements such as an LED and an organic EL element are given as examples of the artificial light source.

In FIG. 5, an air conditioner including an indoor unit 5200 and an outdoor unit 5204 is an example of an electric appliance including the power storage device described in the above embodiment as a power storage device 5203. Specifically, the indoor unit 5200 includes a housing 5201, an air outlet 5202, the power storage device 5203, and the like. Although FIG. 5 illustrates the case where the power storage device 5203 is provided in the indoor unit 5200, the power storage device 5203 may be provided in the outdoor unit 5204. Alternatively, the power storage devices 5203 may be provided in both the indoor unit 5200 and the outdoor unit 5204. The air conditioner can receive power from a commercial power supply. Alternatively, the air conditioner can use power stored in the power storage device 5203. Particularly in the case where the power storage devices 5203 are provided in both the indoor unit 5200 and the outdoor unit 5204, the air conditioner can be operated with the use of the power storage device 5203 as an uninterruptible power supply even when power cannot be supplied from a commercial power supply due to power failure or the like.

Note that although the split-type air conditioner including the indoor unit and the outdoor unit is illustrated in FIG. 5 as an example, the power storage device described in the above embodiment can be used in an air conditioner in which the functions of an indoor unit and an outdoor unit are integrated in one housing.

In FIG. 5, an electric refrigerator-freezer 5300 is an example of an electric appliance including the power storage device described in the above embodiment as a power storage device 5304. Specifically, the electric refrigerator-freezer 5300 includes a housing 5301, a door for a refrigerator 5302, a door for a freezer 5303, the power storage device 5304, and the like. The power storage device 5304 is provided in the housing 5301 in FIG. 5. The electric refrigerator-freezer 5300 can receive power from a commercial power supply. Alternatively, the electric refrigerator-freezer 5300 can use power stored in the power storage device 5304. Thus, the electric refrigerator-freezer 5300 can be operated with the use of the power storage device 5304 as an uninterruptible power supply even when power cannot be supplied from a commercial power supply due to power failure or the like.

Note that among the electric appliances described above, a high-frequency heating apparatus such as a microwave oven and an electric appliance such as an electric rice cooker require high power in a short time. The tripping of a breaker of a commercial power supply in use of an electric appliance can be prevented by using the power storage device described in the above embodiment as an auxiliary power supply for supplying power which cannot be supplied enough by a commercial power supply.

In addition, in a time period when electric appliances are not used, particularly when the proportion of the amount of power which is actually used to the total amount of power which can be supplied from a commercial power supply source (such a proportion referred to as a usage rate of power) is low, power can be stored in the power storage device, whereby the usage rate of power can be reduced in a time period when the electric appliances are used. For example, in the case of the electric refrigerator-freezer 5300, power can be stored in the power storage device 5304 in night time when the temperature is low and the door for a refrigerator 5302 and the door for a freezer 5303 are not often opened or closed. On the other hand, in daytime when the temperature is high and the door for a refrigerator 5302 and the door for a freezer 5303 are frequently opened and closed, the power storage device 5304 is used as an auxiliary power supply; thus, the usage rate of power in daytime can be reduced.

This embodiment can be implemented in appropriate combination with any of the other embodiments.

This application is based on Japanese Patent Application serial no. 2011-191736 filed with Japan Patent Office on Sep. 2, 2011, the entire contents of which are hereby incorporated by reference.

What is claimed is:

1. An electrode for a power storage device comprising:
   a current collector;
   a stress-relieving layer over the current collector; and
   an active material layer including a whisker over the stress-relieving layer,
   wherein a direction of internal stress of the stress-relieving layer is different from a direction of internal stress of the active material layer.

2. The electrode for a power storage device, according to claim 1,
   wherein the internal stress of the stress-relieving layer is compressive stress and the internal stress of the active material layer is tensile stress.

3. The electrode for a power storage device, according to claim 1,
   wherein the whisker includes crystalline silicon.

4. The electrode for a power storage device, according to claim 1,
   wherein the stress-relieving layer comprises an insulating material or a conductive material.

5. The electrode for a power storage device, according to claim 1,
   wherein an absolute value of the internal stress of the stress-relieving layer is almost the same as an absolute value of the internal stress of the active material layer.

6. An electrode for a power storage device comprising:
   a stress-relieving layer,
   a current collector over the stress-relieving layer; and
   an active material layer including a whisker over the current collector,
   wherein a direction of internal stress of the stress-relieving layer is the same as a direction of internal stress of the active material layer.

7. The electrode for a power storage device, according to claim 6,
   wherein the internal stress of the stress-relieving layer and the internal stress of the active material layer are tensile stresses.

8. The electrode for a power storage device, according to claim 6,
   wherein the whisker includes crystalline silicon.

9. The electrode for a power storage device, according to claim 6, wherein the stress-relieving layer comprises an insulating material or a conductive material.

10. The electrode for a power storage device, according to claim 6,
wherein an absolute value of the internal stress of the stress-relieving layer is almost the same as an absolute value of the internal stress of the active material layer.

11. A power storage device comprising:
an exterior member;
a power storage cell in the exterior member;
a positive electrode included in the power storage cell;
a negative electrode included in the power storage cell;
a separator between the negative electrode and the positive electrode; and
an electrolyte solution filled the exterior member,
wherein the negative electrode comprises a current collector, a stress-relieving layer over the current collector, and an active material layer including a whisker over the stress-relieving layer, and
wherein a direction of internal stress of the stress-relieving layer is different from a direction of internal stress of the active material layer.

12. The power storage device according to claim 11,
wherein the internal stress of the stress-relieving layer is compressive stress and the internal stress of the active material layer is tensile stress.

13. The power storage device according to claim 11,
wherein the whisker includes crystalline silicon.

14. The power storage device according to claim 11,
wherein the stress-relieving layer comprises an insulating material or a conductive material.

15. The power storage device according to claim 11,
wherein an absolute value of the internal stress of the stress-relieving layer is almost the same as an absolute value of the internal stress of the active material layer.

16. A power storage device comprising:
an exterior member;
a power storage cell in the exterior member;
a positive electrode included in the power storage cell;
a negative electrode included in the power storage cell;
a separator between the negative electrode and the positive electrode; and
an electrolyte solution filled the exterior member,
wherein the negative electrode comprises a stress-relieving layer, a current collector over the stress-relieving layer, and an active material layer including a whisker over the current collector, and
wherein a direction of internal stress of the stress-relieving layer is the same as a direction of internal stress of the active material layer.

17. The power storage device according to claim 16,
wherein the internal stress of the stress-relieving layer and the internal stress of the active material layer are tensile stresses.

18. The power storage device according to claim 16,
wherein the whisker includes crystalline silicon.

19. The power storage device according to claim 16,
wherein the stress-relieving layer comprises an insulating material or a conductive material.

20. The power storage device according to claim 16,
wherein an absolute value of the internal stress of the stress-relieving layer is almost the same as an absolute value of the internal stress of the active material layer.

* * * * *